(12) United States Patent
Gallant et al.

(10) Patent No.: US 7,743,138 B2
(45) Date of Patent: Jun. 22, 2010

(54) METHOD AND APPARATUS FOR EXTERNAL EVENT NOTIFICATION MANAGEMENT OVER IN-BAND AND OUT-OF-BAND NETWORKS IN STORAGE SYSTEM CONTROLLERS

(75) Inventors: David Austin Gallant, Thornton, CO (US); Paul Andrew Ashmore, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 621 days.

(21) Appl. No.: 11/233,555

(22) Filed: Sep. 22, 2005

(65) Prior Publication Data

US 2007/0073633 A1    Mar. 29, 2007

(51) Int. Cl.
G06F 15/173 (2006.01)
G06F 15/16 (2006.01)
(52) U.S. Cl. .................. 709/224; 709/227; 709/237
(58) Field of Classification Search .................. 709/224
See application file for complete search history.

(56) References Cited

U.S. PATENT DOCUMENTS

| | | | |
|---|---|---|---|
| 5,884,312 A | 3/1999 | Dustan et al. | |
| 6,088,451 A | 7/2000 | He et al. | |
| 6,223,289 B1 | 4/2001 | Wall et al. | |
| 6,269,395 B1 | 7/2001 | Blatherwick et al. | |
| 6,292,904 B1 | 9/2001 | Broomhall et al. | |
| 6,363,388 B1 | 3/2002 | Sprenger et al. | |
| 6,389,542 B1 | 5/2002 | Flyntz | |
| 6,438,618 B1 * | 8/2002 | Lortz et al. | 719/318 |
| 6,480,894 B1 | 11/2002 | Courts et al. | |
| 6,484,174 B1 | 11/2002 | Wall et al. | |
| 6,587,880 B1 | 7/2003 | Saigo et al. | |
| 6,615,264 B1 | 9/2003 | Stolz et al. | |
| 6,757,709 B1 | 6/2004 | Oberdorfer | |
| 6,807,577 B1 | 10/2004 | Gillespie et al. | |
| 6,823,401 B2 | 11/2004 | Feather, Jr. et al. | |
| 6,826,405 B2 | 11/2004 | Doviak et al. | |
| 6,931,530 B2 | 8/2005 | Pham et al. | |
| 7,159,024 B2 | 1/2007 | Mitsuoka et al. | |

(Continued)

OTHER PUBLICATIONS

Official Action for U.S. Appl. No. 11/233,554, mailed Jun. 9, 2008, p. 1-14.

(Continued)

*Primary Examiner*—Rupal D Dharia
*Assistant Examiner*—Richard G Keehn
(74) *Attorney, Agent, or Firm*—Thomas J. Lavan; Bradley Knepper (57) ABSTRACT

Methods and systems for managing user access to a storage system storage controller are provided. In particular, user login requirements and permissions are administered, and individual user and external user interface pairs are tracked, through a user table and a session table established as part of the storage system controller. The external user interfaces may be interconnected to the storage system controller through different networks and/or protocols. Notification of events to external interfaces is performed as part of a task running on the storage system controller. In particular, an event notification manager determines whether notification of an event should be provided in connection with active sessions, with the result that the storage system controller only sends notification of events that have not previously been reported to a user and external interface pair.

9 Claims, 8 Drawing Sheets

U.S. PATENT DOCUMENTS

| | | | |
|---|---|---|---|
| 7,287,063 | B2 | 10/2007 | Baldwin et al. |
| 7,331,049 | B1* | 2/2008 | Jin ............................ 719/314 |
| 7,353,278 | B2* | 4/2008 | Tuunanen et al. ........... 709/227 |
| 7,398,326 | B2 | 7/2008 | Baldwin et al. |
| 2002/0073158 | A1* | 6/2002 | Dalal et al. .................. 709/206 |
| 2003/0208549 | A1* | 11/2003 | El-Shimi et al. ............ 709/207 |
| 2004/0030891 | A1 | 2/2004 | Kurihara |
| 2005/0038791 | A1* | 2/2005 | Ven ............................ 707/100 |
| 2005/0041687 | A1 | 2/2005 | Dowling et al. |
| 2005/0074098 | A1* | 4/2005 | O'Brien et al. .......... 379/88.12 |
| 2005/0094637 | A1 | 5/2005 | Umesawa et al. |
| 2005/0102401 | A1 | 5/2005 | Patrick et al. |
| 2005/0192952 | A1* | 9/2005 | El-Shimi et al. ................ 707/3 |
| 2005/0289105 | A1 | 12/2005 | Cosic |
| 2006/0031447 | A1 | 2/2006 | Holt et al. |
| 2006/0052087 | A1* | 3/2006 | Tuunanen et al. ......... 455/414.1 |
| 2006/0070083 | A1* | 3/2006 | Brunswig et al. ........... 719/318 |
| 2006/0136595 | A1 | 6/2006 | Satyavolu |
| 2006/0177058 | A1* | 8/2006 | Sarwono et al. ............. 380/211 |
| 2006/0218532 | A1* | 9/2006 | Cordella et al. ............. 717/124 |
| 2006/0224400 | A1* | 10/2006 | Chkodrov et al. ............... 705/1 |
| 2006/0277419 | A1 | 12/2006 | McNulty et al. |
| 2006/0288037 | A1* | 12/2006 | Sundararajan et al. ...... 707/102 |
| 2007/0067466 | A1 | 3/2007 | Gallant et al. |
| 2008/0134213 | A1* | 6/2008 | Alverson et al. ............ 719/318 |
| 2008/0320143 | A1 | 12/2008 | Di Benedetto et al. |

OTHER PUBLICATIONS

International Preliminary Report on Patentability for International (PCT) Patent Application No. PCT/US06/35306, mailed Apr. 3, 2008, p. 1-6.
International Preliminary Report on Patentability for International (PCT) Patent Application No. PCT/US06/35305, mailed Apr. 3, 2008, p. 1-5.
International Search Report for International (PCT) Patent Application No. PCT/US06/35306, mailed Sep. 21, 2007, p. 1-3.
Written Opinion for International (PCT) Patent Application No. PCT/US06/35306, mailed Sep. 21, 2007, p. 1-5.
Official Action for U.S. Appl. No. 11/233,554, mailed Nov. 27, 2007, p. 1-11.
International Search Report for International (PCT) Patent Application No. PCT/US06/35305, mailed Jan. 5, 2007, p. 1-4.
Written Opinion for International (PCT) Patent Application No. PCT/US06/35305, mailed Jan. 5, 2007, p. 1-4.
Corrected International Search Report for International (PCT) Patent Application No. PCT/US06/35305, mailed Jan. 24, 2007, p. 1-3.
Corrected Written Opinion for International (PCT) Patent Application No. PCT/US06/35305, mailed Jan. 24, 2007, p. 1-3.
Official Action for U.S. Appl. No. 11/233,554, mailed Jun. 20, 2007, p. 1-10.
Final Office Action for U.S. Appl. No. 11/233,554, mailed Jun. 9, 2008, pp. 1-12.
Official Action for U.S. Appl. No. 11/233,554, mailed Oct. 2, 2008, p. 1-13.
Official Action for U.S. Appl. No. 11/195,157, mailed Mar. 18, 2010.
Office Action in U.S. Appl. No. 11/233,554, Jan. 28, 2010.

* cited by examiner

METHOD AND APPARATUS FOR EXTERNAL EVENT NOTIFICATION MANAGEMENT OVER IN-BAND AND OUT-OF-BAND NETWORKS IN STORAGE SYSTEM CONTROLLERS

CROSS REFERENCE TO RELATED APPLICATIONS

The present application is related to U.S. patent application Ser. No. 11/233,554, filed Sep. 22, 2005, entitled "Method and Apparatus for External Interface User Session Management in Storage System Controllers," the entire disclosure of which is hereby incorporated by reference herein in its entirety.

FIELD

Methods and systems directed to event notification over in-band and out-of-band networks in embedded storage system controllers are disclosed. In particular, methods and systems directed to providing external interfaces with notification of selected storage system events are disclosed.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times.

Storage systems or storage systems that provide at least some integration of individual storage devices, such as JBOD (Just a Bunch of Disks), SBOD (Switched Bunch of Disks) or RAID (Redundant Array of Independent Disks) systems have been developed. Storage systems are typically deployed as a number of individual disk drives or other storage devices within an enclosure to present an integrated component to the user. In addition to the individual storage devices, the enclosure may contain one or more power supplies and one or more cooling devices. Integrated storage systems may also include one or more controllers that can be used to control the distribution of data across the individual storage devices.

In many storage systems, monitoring and management of the storage system by administrators using external interfaces interconnected to the storage system by a network are possible. For example, an external interface comprising a web browser in communication with a storage system over an out-of-band network (i.e. a network that is not used to transfer data for storage on storage devices included in the storage system) can be used to provide an administrator with information related to the status of the storage system. As another example, an external interface comprising a host bus adaptor interconnected to the storage system by an in-band network (i.e. by the network that is typically used transfer data for storage on storage devices included in the storage system) can be used to provide an administrator with information related to the status of the storage system. However, storage systems have not been capable of tracking different external interfaces logged in through both out-of-band and in-band networks, or of tracking the information that has been delivered to external interfaces. In addition, these storage systems have been incapable of allowing a root user or primary administrator to set permissions and otherwise control access to the storage subsystem information from different channels or networks through a unified control facility.

In order to facilitate control and management of integrated storage systems, administrators have been provided with various tools. For example, information related to events associated with a storage system or the status of the storage system can be delivered to external interfaces for review by administrators. In a typical storage system arrangement, the information desired by an administrator or other external user is delivered from the storage system to an external interface in response to polling by an external application. However, because the storage systems have had no way of tracking what information has already been delivered to an external interface, the entire event log is typically sent to the external interface. As a result, the amount of time required to transmit and parse the information can be significant. In addition, high network traffic and high CPU utilization at the storage system and the external interface result from the large data structures being transmitted. These problems can become even more disruptive where a large number of external interfaces are requesting information for a storage system.

SUMMARY

Methods and systems for the administration and control of access to storage system information by a number of external user interfaces interconnected to a storage system controller through either an out-of-band network or an in-band network or both are provided. In particular, a controller of a storage system can manage access to storage system information by users. In accordance with further embodiments of the present invention, notification of events associated with the storage system can be delivered to users intelligently, without sending events that a particular user has indicated they are not interested in, and without re-sending events to a user that have already been reported to that user.

In accordance with embodiments of the present invention, access by users connected through various networks or protocols can be controlled through a single or unified user table maintained by the management controller of the storage system controller. Information maintained in the user table can include user names and passwords for the authorization of users, user access levels, and last login date and time. In accordance with embodiments of the present invention, a session table can also be maintained that is operated in cooperation with the user table. In particular, once a user has provided a valid user name and password, which are checked with reference to the user table, a session for that user can be established in the session table. Once a session has been established for a user, requests from that user can be processed without requiring that the user repeat login or authorization procedures. In accordance with other embodiments of the present invention, multiple sessions associated with different interfaces may be established for a single user simultaneously.

In accordance with additional embodiments of the present invention, event notification is provided. According to such embodiments, a user can register or subscribe to an event notification service provided by an event notification manager process or facility. The event notification manager may comprise a function of a storage system controller, and may further comprise a function of a management controller. In response to receiving notification of a new event, for example through polling of a global event index by the event notification manager, the event notification manager contacts a session manager process or facility to obtain information regarding active sessions. The session manager may comprise a function of the storage system controller, and may further comprise a function of the management controller. In addition to identifying currently active sessions, information provided to the event notification manager by the session manager may comprise a notification mask for each active session. From the information regarding each currently active session, the event notification manager creates an event package for each active session. The event package for a session generally contains those events of the type that are subscribed to for the session and that have not previously been reported. Accordingly, the delivery of information can be controlled by the storage system controller, reducing the amount of bandwidth of the first and/or second networks required to supply event notifications.

Additional features and advantages of the present invention will become more readily apparent from the following description, particularly when taken together with the accompanying drawings.

DETAILED DESCRIPTION

Figure 1:
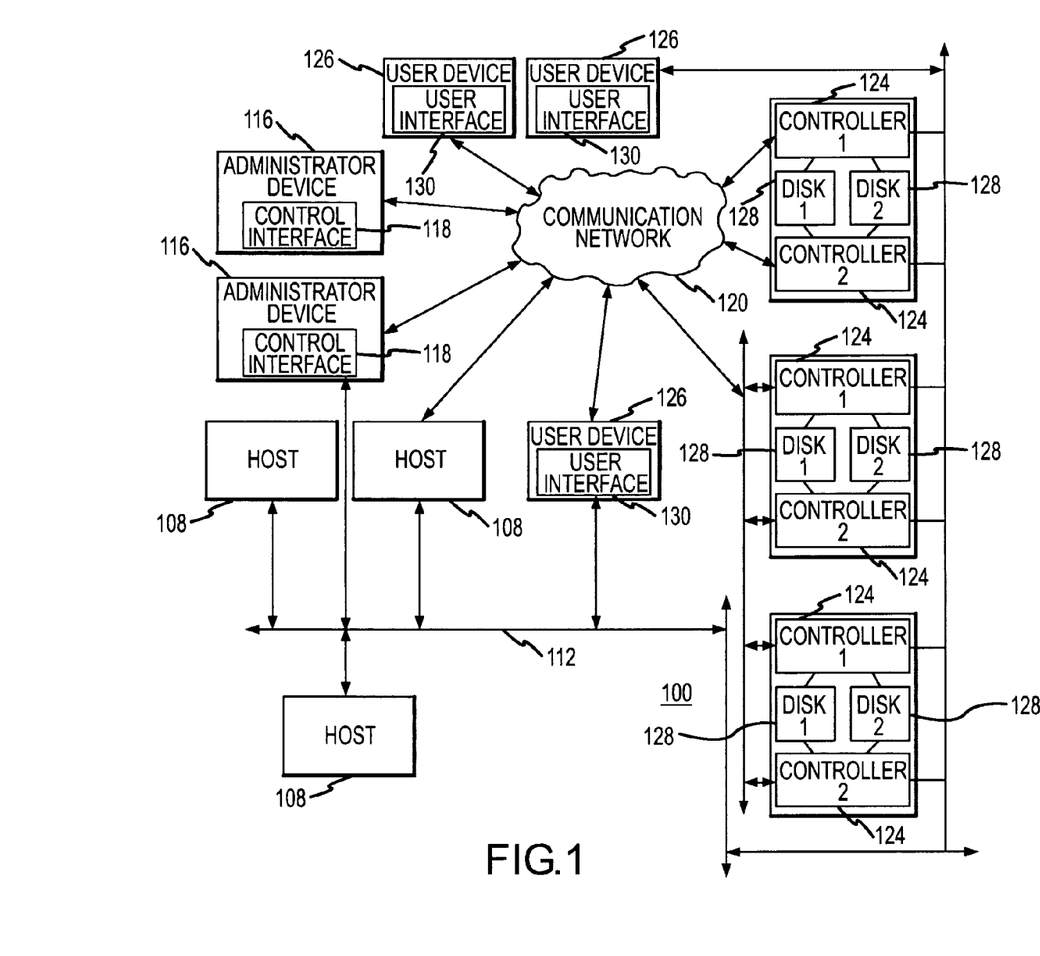
FIG. 1 is a block diagram of components of a system in accordance with embodiments of the present invention.

With reference now to FIG. 1, a data system 100 associated with a number of storage systems 104 is illustrated. A storage system 104 may generally comprise a means for data storage. The storage systems 104 are generally interconnected to one or more host processors or computers 108 by an in-band network 112. A host computer 108 generally comprises a means for sending and/or receiving data. In addition, the data system 100 generally includes one or more administrator computers 116 interconnected to at least one of the storage systems 104 through the in-band network 112 and/or a communication or out-of-band network 120. Each administrator computer 116 may include or be associated with a storage system control interface 118 application to facilitate or enable control of aspects of a storage system 104. Together, an administrator computer 116 and associated storage system control interface 118 generally comprise a means for administering. The data system 100 also includes a number of user devices 126 interconnected to one or more storage systems 104 through the in-band network 112 and/or the out-of-band network 120. Each user device 126 may include or be associated with a user interface 130. A user device 126 and an associated user interface 130 generally comprise a means for issuing commands and obtaining information.

In accordance with embodiments of the present invention, a storage system 104 may comprise one or more controllers 124 and one or more data storage devices 128. Accordingly, storage system 104 may comprise an integrated storage system. In general, a storage system controller 124 controls the data storage and retrieval of data to or from the storage devices 128. In addition, the storage system controller 124 may perform other functions, such as parity checking and error correction. Furthermore, a storage system controller 124 in accordance with embodiments of the present invention may operate to maintain user data, session data, and/or event notification data related to the associated storage system 104 and to authorized users and/or user devices 126. A storage system controller 124 also generally operates to receive and/or execute commands through one or more external user interfaces in association with its storage system 104, and to control the storage of data to and retrieval of data from data storage devices included in the associated storage system 104. The external user interfaces may be established over the in-band network 112 or over the out-of-band network 120. Furthermore, in accordance with embodiments of the present invention, external user interfaces over both the in-band network 112 and the out-of-band network 120 are supported by the storage system controller 124. In general multiple storage system controllers 124 are included in each storage system 104, in order to provide redundancy for improved data availability. As can be appreciated by one of skill in the art, providing multiple storage system controllers 124 is often desirable in order to provide redundancy, and therefore provide improved fault tolerance and data availability. In addition, providing multiple storage system controllers 124 can improve data throughput. Storage system controllers 124 may also be provided as field replaceable units that are received by corresponding slots when installed in a storage system 104. As can be appreciated by one of skill in the art, a storage system controller 124 may be implemented in connection with one or more general purpose processors executing instructions stored as firmware or software. Furthermore, a storage system controller 124 may include volatile and nonvolatile memory for use in connection with the execution of the instructions and for the storage of data used in implementing functions of the storage system controller 124.

A storage system 104 may include a number of data storage devices 128. If multiple data storage devices 128 are provided, they may be grouped in various coordinated ways, for example to provide redundancy, and/or to provide improved data throughput as compared to an uncoordinated grouping of data storage devices 128. Examples of different data storage devices 128 that may be included in a storage system 104 include hard disk drives, such as Fibre Channel (FC) hard disk drives. Other examples of data storage devices that may be used in connection with embodiments of the present invention include serial advanced technology attachment (SATA) disk drives and small computer systems interface (SCSI) disk drives. Embodiments of the present invention may also utilize data storage devices 128 other than devices utilizing magnetic disks as a storage medium. For example, a data storage device 128 may also include magnetic tape, optical storage devices or solid-state disk devices.

The in-band or storage area network 112 generally functions to transport data between storage systems 104 and host devices 108, and can be any data pipe capable of supporting multiple initiators and targets. Accordingly, examples of in-band networks 112 include Fibre Channel (FC), iSCSI, parallel SCSI, Ethernet, ESCON, or FICON connections or networks, which may typically be characterized by an ability to transfer relatively large amounts of data at medium to high bandwidths. The in-band network can also be used for the transfer of notifications of events, communications and/or commands between storage systems 104, host devices 108, administrator computers 116, and/or user devices 126. The out-of-band network 120 generally functions to support the transfer of notifications of events, communications and/or commands between various network nodes, such as storage systems 104, host devices 108, administrator computers 116, and/or user devices 126, although data may also be transferred over the in-band communication network 120. Examples of an out-of-band communication network 120 include a local area network (LAN) or other transmission control protocol/Internet protocol (TCP/IP) network. In general, the out-of-band communication network 120 is characterized by an ability to interconnect disparate nodes or other devices through uniform user interfaces, such as a web browser. Furthermore, the out-of-band communication network may provide the potential for globally distributed management, or even management of systems that include components that are in near-Earth orbit.

As shown in FIG. 1, every node, computer or device 104, 108, 116 and 126, need not be interconnected to every other node or device through both the in-band network 112 and the out-of-band network 120. As a further example, none of the host devices 108 needs to be interconnected to any other host device 108, storage system 104, or administrator computer 116 through the out-of-band communication network 120, although interconnections between a host device 108 and other devices 104, 108, 116, 126 through the out-of-band communication network 120 are not prohibited. Furthermore, an administrator computer 116 is generally interconnected to at least one storage system 104 through the out-of-band communication network 120. An administrator computer 116 may also be interconnected to the in-band network 112 directly, although such an interconnection is not required. Instead, an administrator computer 116 is typically interconnected to the in-band network 112 through a storage system controller 124 of a storage system 104, as described herein. Furthermore, a user device may be interconnected to other devices 104, 108, 116, 126, and in particular to one or more storage system controllers 124 of one or more storage systems 104, through either the in-band network 112 or the out-of-band network 120, or through both the in-band network 112 or the out-of-band network 120.

Figure 2:
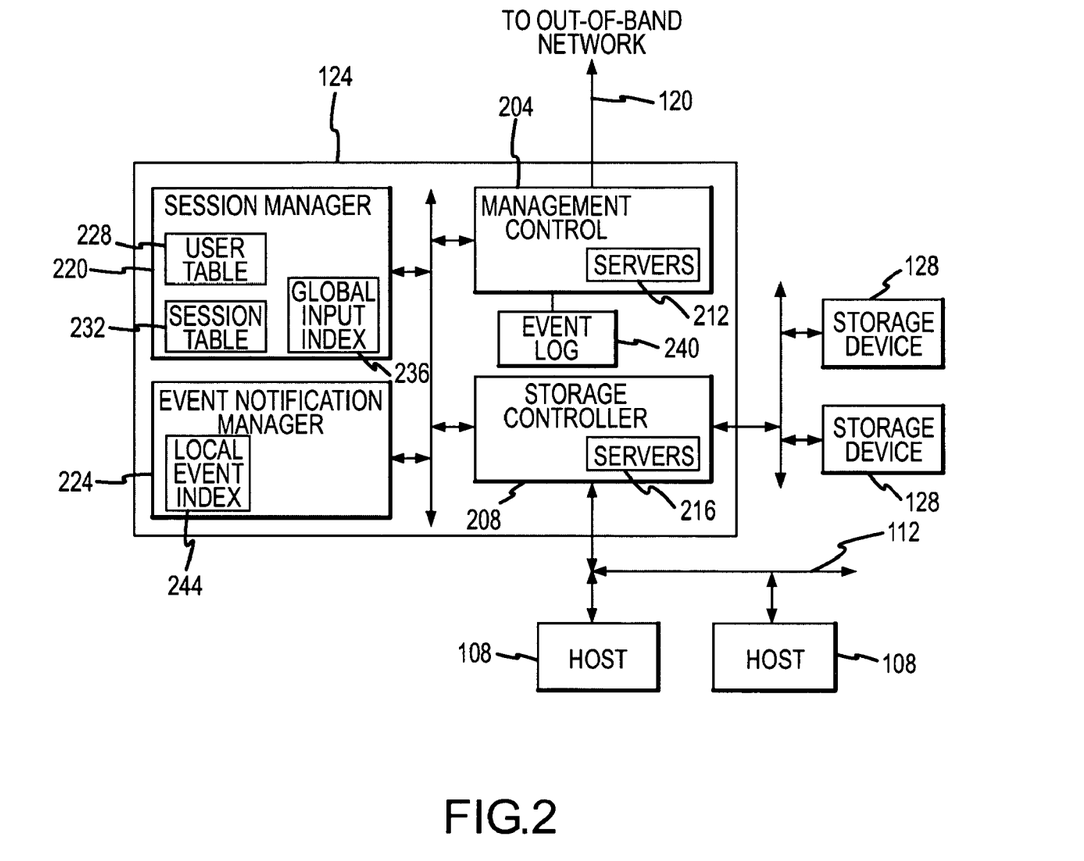
FIG. 2 is a block diagram of aspects of a storage system controller in accordance with embodiments of the present invention.

With reference now to FIG. 2, components of a storage system controller 124 in accordance with embodiments of the present invention are illustrated. In particular, a storage system controller 124 having a management controller 204 and a storage controller 208 that is at least logically separate from the management controller 204 is illustrated. That is, the management controller 204 and storage controller 208 may be implemented with common (i.e., the same) hardware running separate management controller 204 and storage controller 208 threads. In accordance with other embodiments of the present invention, the management controller 204 and the storage controller 208 may be implemented using physically separate processors, or by a combination of shared and separate processors. In general, the management controller 204 performs functions associated with the administration of a storage system 104. Accordingly, the management controller 204 may incorporate or operate in association with an out-of-band network 120 to provide an interface to external user interfaces associated with a particular communication protocol, such as web browsers, RS232, telnet or other protocols running on an administrator computer 116 or a user device 126. Such a management controller 204 may therefore be connected to the out-of-band communication network 120. In addition, the management controller 204 may perform functions associated with the collection and maintenance of information related to the identity and operation of storage systems 104 other than the storage system 104 with which the management controller 204 is a part. The management controller 204 may also permit an administrator to control aspects of the operation of the storage system 104 of which the management controller 204 is a part.

The storage controller 208 generally functions to control the storage and retrieval of information to and from data storage devices 128. Accordingly, the storage controller 208 receives or coordinates the receipt of data from host devices 108 via the in-band network 112 for storage on the data storage devices 128. The storage controller 208 may also function to perform parity operations and the distribution of data across multiple storage devices 128. The storage controller 208 also generally functions to retrieve data from data storage devices 128 on the associated storage system 104, perform error checking and/or correction, and deliver retrieved data to a requesting host device 108 via the in-band network 112. In addition, the storage controller 208 may operate in association with an in-band network 112 to provide an interface to external user interfaces associated with a particular communication protocol, such as a command line interface protocol associated with a host bus adaptor running on an administrator computer 116 or a user device 126. The storage controller 208 may also generate status information regarding the storage controller 208, or may receive status information from storage devices 128 or other components of the storage system 104, which can be stored and/or delivered to a host interface.

The storage system controller 124 also includes a session manager 220 and an event notification manager 224. Although illustrated as separate processes or functions, it should be appreciated that the session manager 220 and/or event notification manager 224 may be implemented in whole or in part as a function of another process. For example, the session manger 220 and/or event notification manager 224 may be implemented by a thread or a set of instructions comprising the management controller 204 or the storage controller 208. In accordance with certain instances of the present invention, the session manager 220 and the event notification manager are both processes or system tasks implemented by the management controller 204. Accordingly, the session manager 220 and the event notification manager 224 may comprise processes implemented through the execution of programming code on hardware implementing or associated with the management controller 204.

The session manager 220 generally functions to control the establishment and maintenance of user sessions in association with a storage system 104. In order to enable verification of authorized users, the session manager 220 may include a user table 228. As can be appreciated by one of skill in the art, the user table 228 may be established in non-volatile memory (such as flash memory), and read from that memory to RAM on start up of the storage system controller 124. An example user table 228 is illustrated in Table 1.

TABLE 1

| [username] | [password] | [last login] | [telnet user level] | [http] | [ftp] | [RS232] | [inband] |
|---|---|---|---|---|---|---|---|
| dave | 0x32245331 | Mar. 05, 2004 1:17 | 10 | 5 | 1 | 10 | 10 |
| gary | 0x26625624 | Jan. 05, 2004 1:17 | 5 | 1 | 10 | 1 | 5 |

As shown in Table 1, the user table 228 may include columns for user name, password, last login, and user access levels for supported communication protocols. The protocols may include telnet, http, ftp, RS232 or other out-of-band network 120 interfaces, and in-band network 112 interfaces. Examples of other communication protocols that may be supported include Secure Shell (SSH) and SCSI Enclosure Service (SES) in a vendor specific mode of operation. Each row may be ordered by an authorized user. Accordingly, the user table 228 may serve as a repository for user name and password information that must be submitted to the session manager 220 in order to validate or authorize access to the storage system controller 124 and the associated storage system 104. In addition, the user table 228 may serve as a repository for access levels assigned to listed users for the various protocols. Furthermore, information such as passwords may use some form of encryption in memory to maintain security. The user table 228 may also store other information, such as information related to the date and time of each user's last login. In accordance with still other embodiments of the present invention, different access levels may be assigned for different external interfaces for each protocol. Accordingly, the user table 228 may be expanded to include each supported combination of user interface and protocol, to permit the assignment of different access levels to each. In order to reduce the number of columns required as part of the user table, bitmaps may be used.

As can be appreciated by one of skill in the art, by maintaining information regarding authorized users in a user table, 228, the associated controller 124 provides a central repository for such information. In addition, the user table 228 allows for the ordering of information by user, and accommodates the definition of user access (and user access levels) for different protocols using different networks. More particularly, user access through either (or both) the in-band network 112 and the out-of-band network 120 is supported. Accordingly, the administration of access to a storage system 104 is facilitated through the provision of a user table 228.

The user table 228 may also be expanded to include columns that are referenced in connection with providing notification of events to users. For example, the user table 228 may include an ID column to allow a unique user handle to be created for each user. The user table can also include a column for an event notification mask that allows those events (e.g. event types) that the user is to be notified of. An example of a partial user table 228 illustrating such additional columns and example values is shown in Table 2.

TABLE 2

| [username] | ... | [id] | [event mask] |
|---|---|---|---|
| dave | | DG | A |
| gary | | Gary | B |

The session manager 220 may also include or implement a session table 232. The session table 232 serves as a repository for information regarding active sessions. The session table 232 contains all the users that are currently logged into one of the storage system controller's 124 external user interfaces. In particular, after a user has logged in, for example by providing a valid user name and password (as maintained in the user table 228), a session is established for that user and the associated protocol and/or user interface. An example session table 232 is illustrated in Table 3.

TABLE 3

| [session_id] | [user] | [prot] | [inter] | [login_time] | [last_hrtbeat] | [timeout] | [socket] | [inBnd_offset] |
|---|---|---|---|---|---|---|---|---|
| 0x23531522 | dave | telnet | cli | 10:04/07:02 | 07:02:03 | 30 | 65838 | 0x0 |
| 0x45828276 | dave | rs232 | cli | 10:04/05:14 | 07:09:03 | 10 | 0 | 0x0 |
| 0x45828276 | gary | http | wbi | 10:04/03:23 | 08:01:03 | 30 | 0 | 0x0 |
| 0x45828276 | cris | inband | host app | 10:04/11:13 | 08:01:03 | 0 | 0 | 0x55 |

As shown in Table 3, the session table may include columns identifying the session (session_id), the user, the applicable protocol (prot), and the applicable interface (inter). In addition, columns may be included for login time (login_time), last heartbeat (last_hrtbeat) and timeout. That is, the session table can include information that can be used to justify terminating a session if it has been inactive for some selected period of time, and/or if the total session time exceeds some selected period of time. The session table 232 can also include information regarding the socket and the in-band offset (if applicable)(inBnd_offset) for the communication channel used by each session. The time out value may be entered by a user at the initiation of the session, or may defined for the user and stored, for example as part of the user table.

The creation of sessions allows users to issue commands to and receive responses from the storage system controller 124 without needing to provide credentials with each command. Instead, a user need only provide a valid user name and password through a protocol as part of initially establishing a session. Once the session is established by issuing a session identifier to the session, the user can continue to issue commands and receive responses through the protocol and interface used to establish the session. In addition, as shown in the example of Table 3, multiple sessions established through different protocols and/or interfaces may exist simultaneously for a single user. As a result, when a command is received in connection with an active session, the only verification that needs to be made is whether the command is permitted under the access level assigned to the applicable user and protocol and/or interface combination.

In accordance with further embodiments of the present invention, the session table 232 may be expanded to support event notification features. An illustration of a portion of a session table comprising additional columns that can be added to, for example, the columns shown in Table 3, is shown in Table 4.

TABLE 4

| [user] ... | [notification] | [async] | [format] | [last event ID] | [notification mask] |
|---|---|---|---|---|---|
| dave | on | yes | clear | DD | 0 |
| dave | off | no | verbose | DC | 24 |
| gary | on | no | html | DD | 200 |
| cris | on | no | clear | DC | 0 |

As illustrated by Table 4, a column may be added to track whether notification has been enabled for the session. Accordingly, the value held by the notification column may be either "on" or "off." Another column may be used to indicate whether the current protocol and/or external user interface is able to accept asynchronous messaging (async). The value held by the async column may be either "yes" or "no." For example, users connected through in-band communications generally can not be sent asynchronous data, so the value in the async column for such users would be "no," while users tied to a telnet socket can be sent asynchronous data, so the value in the async column for such users could be either "yes" or "no." A column for the format of the data can be used to indicate what formatting will be applied to the event before it is sent to the user. Examples of formats include xml, html, or clear text output formatting. A last event ID column holds the event ID that was last successfully sent to the external interface. As illustrated in Table 3, the last event ID can be represented by a hexadecimal integer value. Another column that can be added is for the notification mask. The notification mask holds a copy of the user-specific event notification mask. The event notification mask can be modified to change the per-session notification characteristics, without affecting the global user setting. In accordance with embodiments of the present invention, the event notification mask can be represented by a 32 bit integer value.

In connection with logging events associated with or occurring on the storage system associated with a storage system controller 124, a global event index 236 may be maintained by the storage system controller 124. More particularly, the global event index 236 is, in accordance with embodiments of the present invention, managed by the session manager 220. In general, the global event index 236 keeps track of events stored in a global event log 240 contained in (or associated with) and maintained by the management controller 204. Alternatively, the global event index 236 and the global event log 240 may be integrated into a single indexed global event log 240. The global event log 240 is a repository for information regarding status changes associated with the management controller 204, the storage controller 208, other parts of the storage system controller 124, the in-band network 112, the out-of-band network 120, the storage system 104 storage devices 128, a paired storage system controller 124 or any other events occurring in, affecting, or tracked by the storage system controller 124.

The event notification manager 224 operates to determine when new events have been added to the global event log 240 by polling the global event index 236 (or the global event log 240 itself), and comparing the last indexed event to the last event in a local event index 244 maintained by the event notification manager 224. The last indexed event in the local event index 244 identifies the last event that was available for reporting to user interfaces. If the latest event in the global event index 236 does not equal the latest event in the local event index 244, the event notification manager 224 will begin a notification routine. In accordance with embodiments of the present invention, only the session manager 220 has write access to the global user data table 228, the global session table 232, the event log 240 and or the global event index 236.

Figure 3:
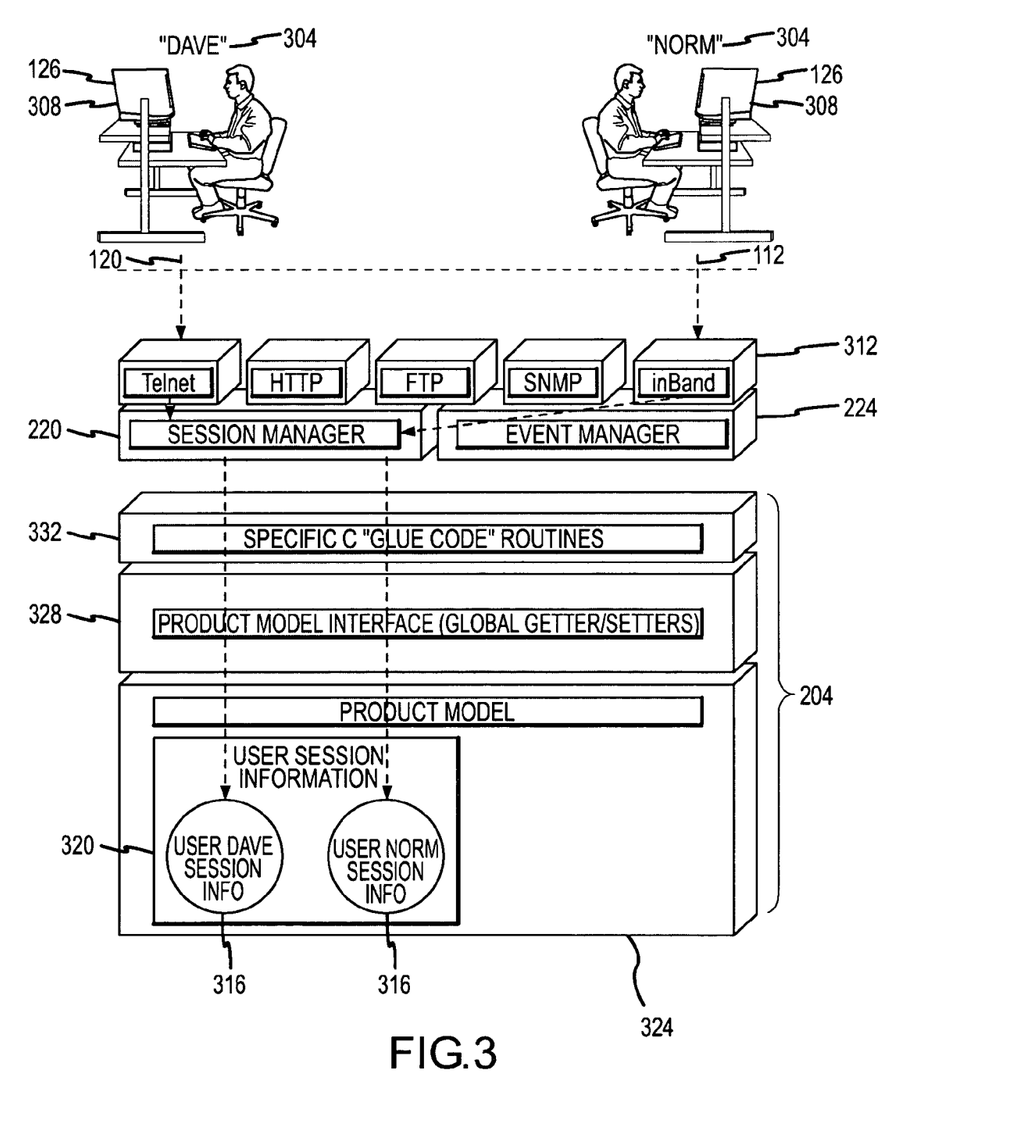
FIG. 3 is a depiction of the establishment and maintenance of sessions in connection with a storage system controller in accordance with embodiments of the present invention.

With reference to FIG. 3, the relationship of different functional layers established by a management controller 204 in connection with the establishment of user communication sessions between external user interfaces and the controller 124 across dissimilar networks 112, 120 in accordance with embodiments of the present invention are illustrated. As used herein, an "external user interface" is a user interface that is outside of a management controller 204. Accordingly, examples of external user include user interfaces comprising administrator devices 116 or user devices 126 in communication with a management controller 204 over a network 112 or 120 using a particular communication protocol. In particular, FIG. 3 illustrates that different users 304 may, through different external user interfaces 308 using different communication protocols 312 associated with different networks 112, 120 can communicate with the management controller 204. For instance, the illustrated example shows a first user "Dave" 304 at a first external user interface 308 comprising a first user device 126 in communication with the management controller 204 through a telnet interface 312, which would be established over the out-of-band network 120, and a second user "Norm" 304 at a second external user interface 308 comprising a second user device 126 in communication with the management controller 204 through an in-band interface 312, which would be established over the in-band network 112.

For each user, a session 316 represented by associated user session information 320, is established. In accordance with embodiments of the present invention, each session comprises a row in a session table 232 comprising the user session information 320. In addition to the core management controller 204 functions 324, which may be implemented by the execution of software, firmware, or hardcoded instructions, and which may include the establishment and maintenance of user session information 320 comprising user sessions 316, for example as part of a session table 232, the management controller 204 may also provide other layers of functions. For example, an interface function layer 328 may be provided for handling exchanges of information with other modules or functions, and other layers. Glue code routines 332 may also be provided as necessary or desired to interface with other functions or tasks, such as the session manager 220 and the event notification manager 224. By providing a layered architecture, the management controller functions and processes can easily be divided among a number of processors and/or devices, if desired. That is although embodiments of the present invention provide for the establishment and management of sessions within a single controller 124, other embodiments of the present invention may provide for distributed processing for performing such functions.

Figure 4:
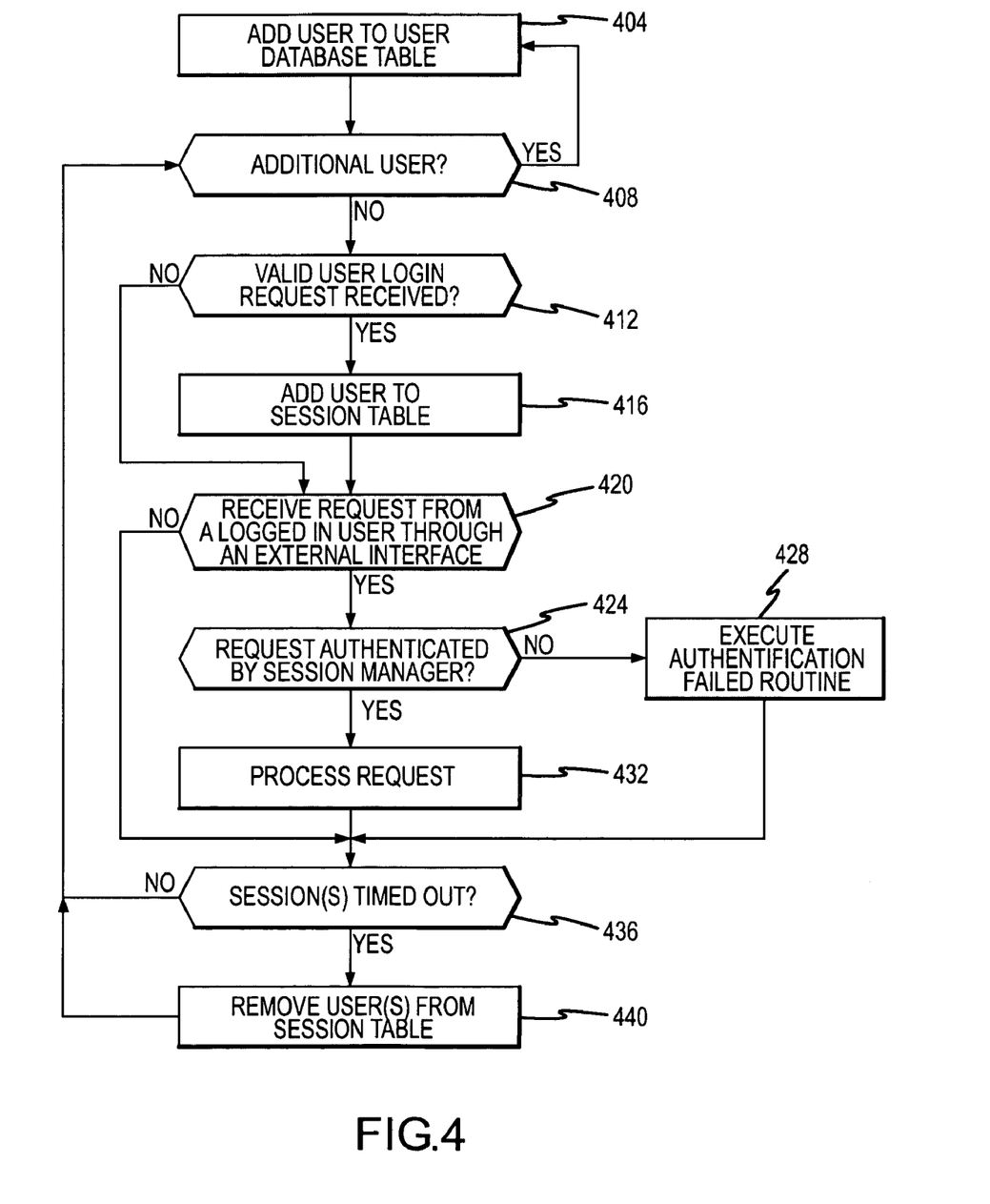
FIG. 4 is a flow chart illustrating aspects of the operation of a storage system controller in accordance with embodiments of the present invention in connection with the establishment and use of sessions.

With reference now to FIG. 4, aspects of the operation of a storage system 104 in accordance with embodiments of the present invention in connection with the establishment of user sessions are illustrated. At step 404, a user 304 is added to a user database table or user table 228. Adding a user 304 is typically performed by an administrator, through an administrator device 116. Information that is added to the user table 228 by the administrator can include the user name or user ID identifying the user and that must be entered by the user as part of the user log-in process, and the user password that must also be entered by the user as part of the user log-in process. Other information that can be entered by the administrator for each user includes user access levels. As used herein, user access levels define or limit what user commands are authorized for a user. Embodiments of the present invention also permit an administrator to enter different access levels for different external user interfaces 308 for a user 304, including external user interfaces 308 established across different networks 112, 120. Accordingly, it can be appreciated that an administrator can, through the user table 228, control access to a controller 124 by users 304. At step 408, a determination is made as to whether additional users 304 remain to be added to the user table 228. If additional users 304 are to be added, the process returns to step 404.

If no additional users are to be added, a determination may be made as to whether a valid user log-in request has been received (step 412). A valid user log-in request may comprise the presentation of a valid user name and password to the session manager 220 task of the management controller 204. In accordance with a user that is not granted access across all external user interfaces 308 supported by the controller 124, the log-in request must also be made using an external interface 308 that is approved for that user. That is, the log-in request must be received from an external interface 308 that the user is permitted to use to access the controller 124. If a valid log-in request has been received from a user 304, that user 304 is added to the session table 232 (step 416). Furthermore, a user 304 can be listed in the session table 232 more than once, where the user is logged in through different external interfaces 308.

Once a user 304 is logged-in and represented in the session table 232, a determination can be made as to whether a request from a logged-in user 304 has been received through an external interface 308 (step 420). If a request has been received, it may be authenticated by the session manager 220 (step 424). Authentication may comprise determining whether the request is received in association with a valid session identifier. That is, authentication does not require that the user 304 provide a user name and password after a session has been established, at least while the established session remains active. Instead, the session ID sent with each command from the user 304 following log-in is used in connection with validating the request or command. Authentication may also comprise determining whether the request or command is within the access level assigned to a user 304 and external interface 308 pair for which an active session is in place. If authentication fails, an authentication failed routine may be executed (step 428). The execution failed routine may provide notification of the failure of authentication as appropriate for the external interface 308 through which the request was received. If the request is successfully authenticated, the request is processed (step 432). Examples of requests or commands that can be processed by the management controller 204 include report statistics, create arrays or partitions, and configure external interfaces.

If a valid user log-in request is not received (at step 412), if a request from a logged in user through an external interface is not received (at step 420), after executing an authorization failed routine (at step 428), or after processing a user request (at step 432), a determination may be made as to whether any sessions have timed out (step 436). If a session has timed out, the user 304 and external interface 308 pair associated with each timed out session is removed from the session table 232 (step 440). If no sessions have timed out, or after removing any timed-out sessions from the session table 232, the process may return to step 408.

Figure 5:
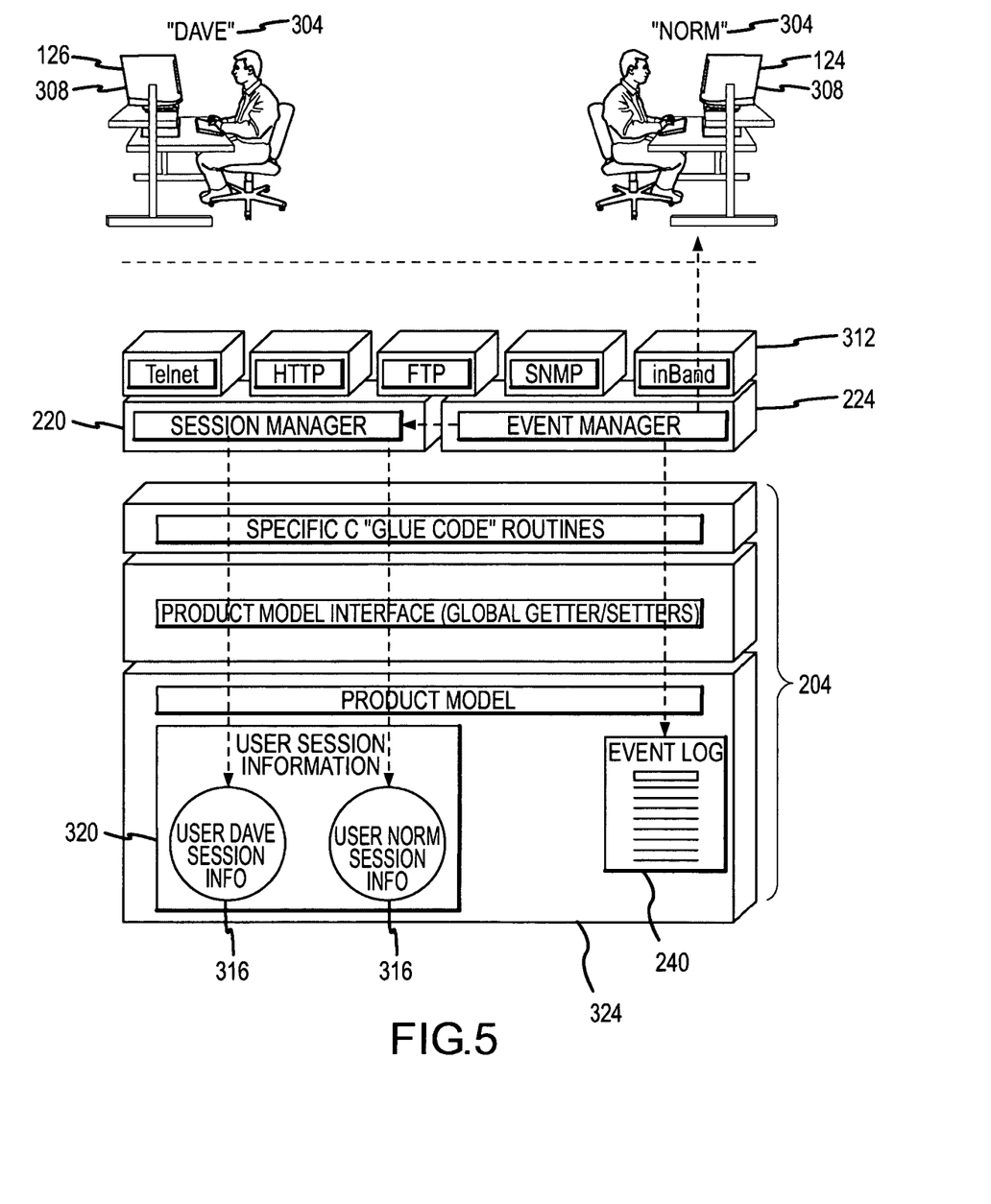
FIG. 5 is a depiction of the notification of events to subscribing user interfaces in accordance with embodiments of the present invention.

With reference to FIG. 5, the relationship between different functional layers established by a management controller 204 in connection with the notification of events for established communication sessions are illustrated. In particular, a first user "Dave" 304 is shown as having established a session 316 on the management controller. In addition, a second user "Norm" is shown as having established a session 316 on the management controller 204. The event log 240 is also shown. When a user, has established a session 316, the event notification manager 224 references the session 316 for that user 304 to determine various parameters related to how notification (or if any notification) should be provided, and to determine the last event that the user 304 or user 304 and external interface 308 pair was notified of. The event notification manager 224 can then obtain those events that have not been delivered to the user 304, and format them as indicated in the session information for each user 304 and the external interface 308 on which the notification is to be delivered. As depicted in FIG. 5, the event notification manager 224 has reference the session information 316 and the global event log 240, and provided notification of an event to user 304 "Norm" in cooperation with the session manager 220.

Figure 6:
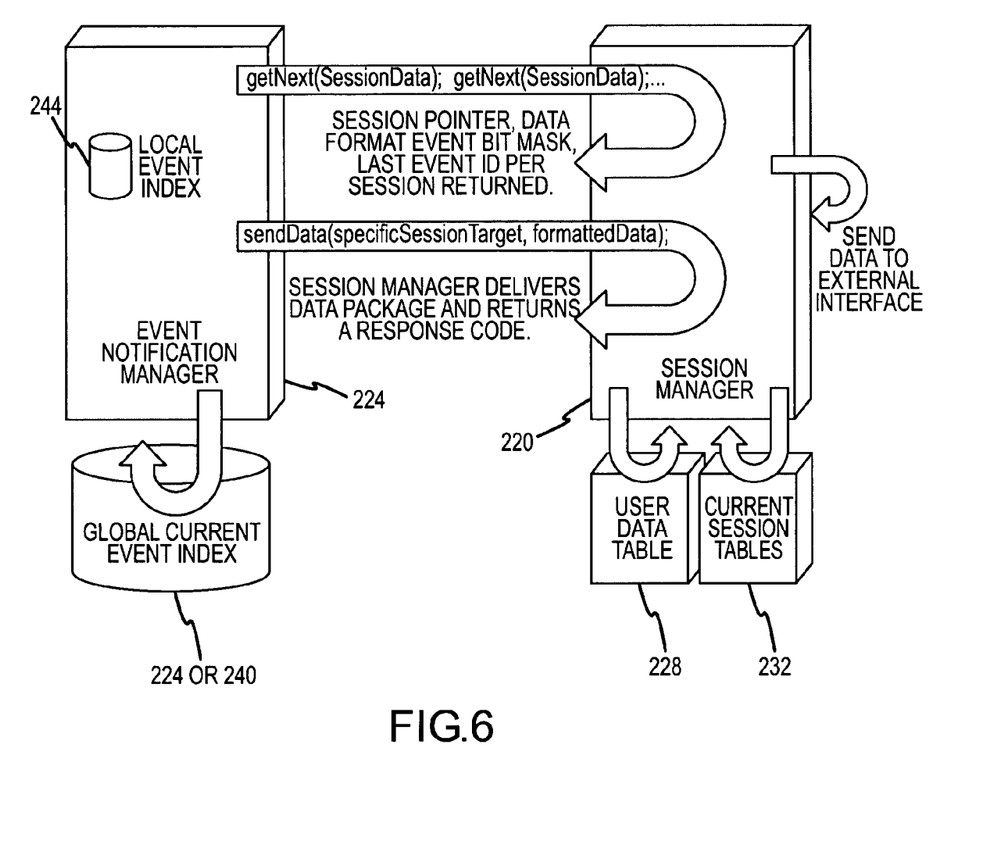
FIG. 6 is a depiction of interactions between an event notification manager and a session manager in accordance with embodiments of the present invention.

In FIG. 6, interactions between an event notification manager 224 and a session manager 220 in connection with the delivery of event information to external user interfaces 308 in accordance with embodiments of the present invention are depicted. In general, the event notification manager 224 polls the indexed global event log 240 (or a global event index 226 is provided separately from the global event log 240) to check for new events that have been logged by the management controller 204. New events can be detected by comparing latest index value in the global index 226 or 240 to the latest index value in the local event index 244 maintained by the event notification manager.

In response to detecting that there are new events in the global event log 240, the event notification manager obtains next session data from the session manager 220 for each active session. The session data is obtained by the session manager 220 from the user data table 228 and/or the current session table 232, and can include information on the required data format, event bit mask, last event ID or other information for each active session.

The event notification manager 224, in response to receiving session data from the session manager 220 for a session, formats the events that have not yet been provided to the user as part of the session or that are otherwise subscribed to as part of the session, and delivers an event notification package to the session manager 220. The session manager 220 then returns a response code to the event notification manager 224. The session manager 220 sends the event notification package to the external user interface 308 for the session, and updates information in the session table 232 related to the identity, time and other parameters maintained in that table 232 regarding the last notification that was made for the session. The event notification manager 224, after notification has been delivered to the session manager 220 for all of the active sessions requiring notification, increments the local event index 244 and returns to polling the global event index 224 or 240 for new events.

Figure 7A:
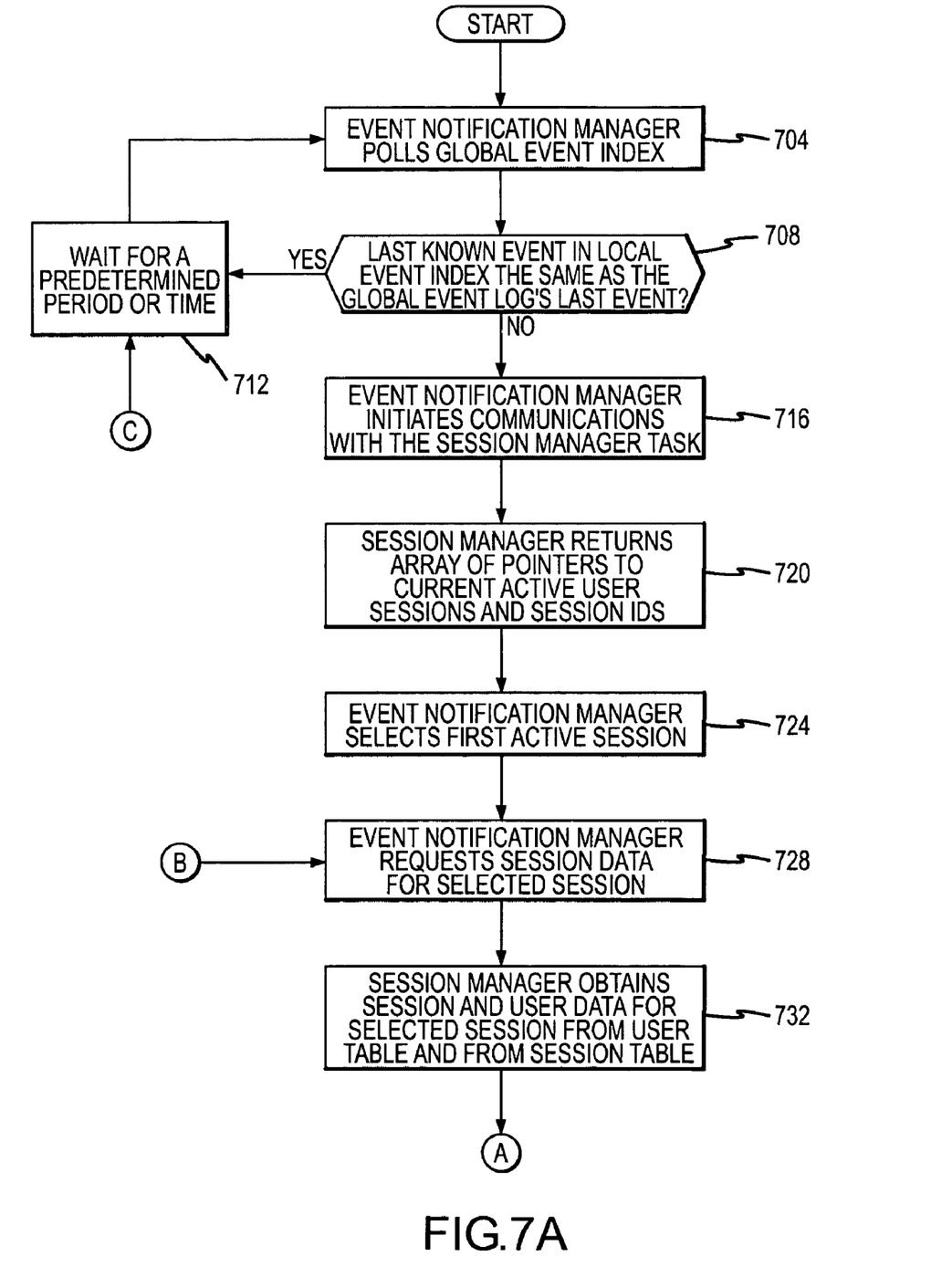
FIGS. 7A and 7B are a flow chart illustrating aspects of the operation of a storage system controller in accordance with embodiments of the present invention in connection with the notification of events to user interfaces.
Figure 7B:
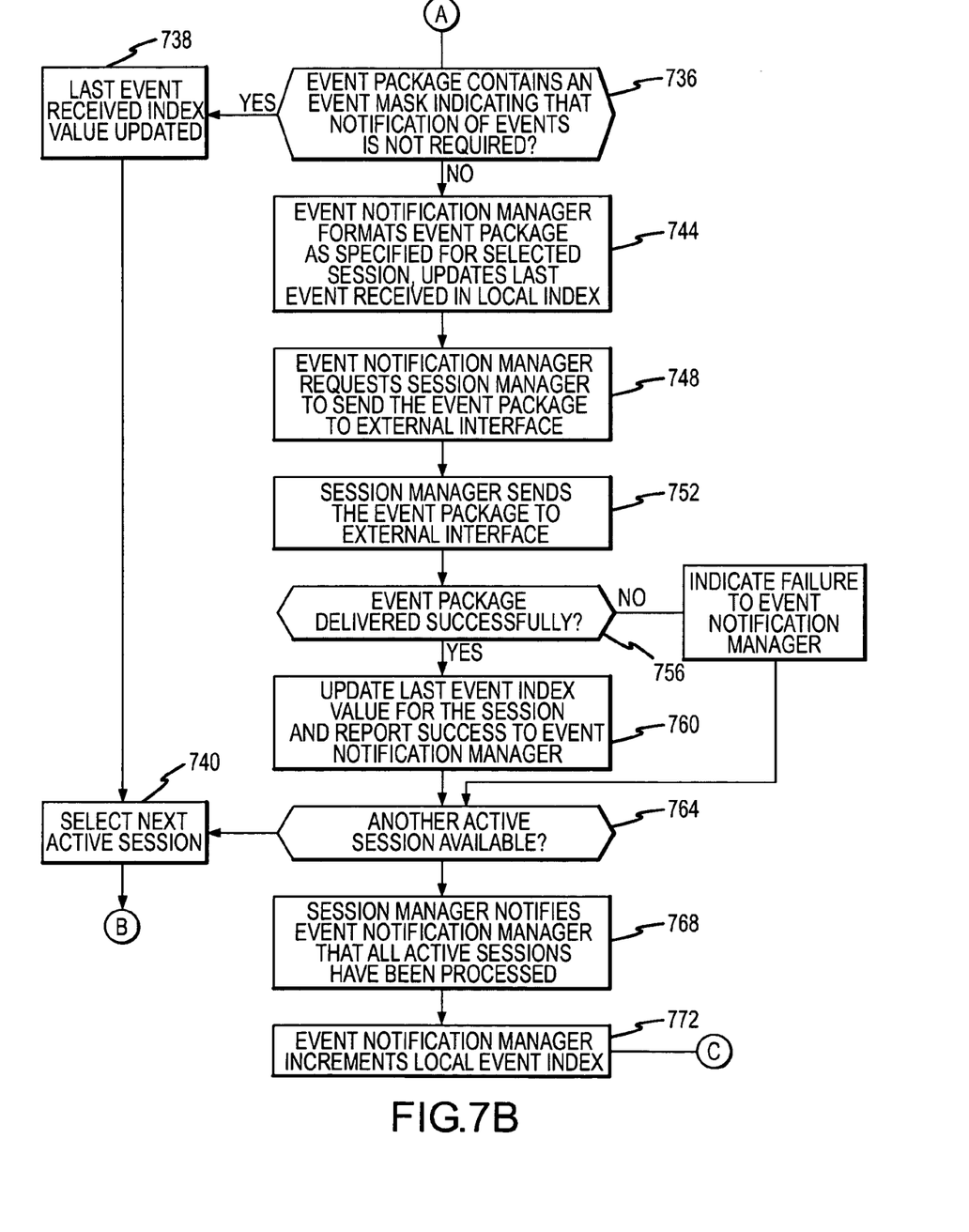

In FIGS. 7A and 7B, aspects of the operation of a storage system controller 104 in accordance with embodiments of the present invention in connection with the notification of events to external user interfaces 308 are depicted. After starting or enabling the management controller 204 and the event notification tasks and facilities, the event notification manager polls the global event index 224 (or the indexed global event log 240). A determination is then made as to whether the last known event (i.e. the most recent event) in the local event index 244 is the same as the last event (i.e. the most recent event) in the global event log 240 (step 708). If the last known event in the local event index 244 is the same as the last event in the global event log 240, the event notification manager 224 task waits a predetermined period of time (step 712), and then returns to step 704. In accordance with an exemplary embodiment of the present invention, the predetermined period of time is 1 second, resulting in a polling rate of about every 1 second. However, other polling rates may be applied.

If it is determined that the last known event in the local event index 244 is not the same as the last event in the global event log, the event notification manager 224 initiates communications with the session manager 220 task (step 716). For example, if the global event index value for the latest event in the global event log 240 changes from "104" to "105", the event notification manager 224 will compare that value to the local event index value of "104" to find that it needs to begin a notification routine. In particular, the event notification manager 224 may send the session manager 220 a request for active sessions. In response, the session manager 220 returns an array of pointers to the current active user sessions and the associated session identifiers (IDs) (step 720). The event notification manager 224 then selects the first active session (step 724).

At step 728, the event notification manager 224 sends a request to the session manager 220 for the session data associated with the selected session. More particularly, the event notification manager 224 may request event information for the first known session. In response to receiving the request for session data from the event notification manager 224, the session manager 220 grabs the first known session entry and gathers the requested session and user data (step 732). The information gathered by the session manager 220 in response to the request by the event notification manager 224 can include the user name, the event notification mask, and the event format, which are obtained from the user data table 228. In addition, the information gathered by the session manager 220 can include a pointer to the session, a pointer to the last event received by the user in association with the session, a pointer to the event mask for the user, and a pointer to the data format for the session, which are obtained from the session table 232.

At step 736, the event notification manager 224 determines whether the data for the session returned by the session manager 220 contains an event notification mask indicating that notification of events is not required. If it is determined that notification of events is not required (i.e. the notification feature has been turned off for the user), the index value for the last event received for the session is updated in the session table 232 (step 738), and the event notification manager 224 moves to the next session (step 740). If event notification has not been turned off, the event notification manager 224 formats an event package as specified by the information received regarding the selected session (step 744). The event package contains only those events that the user has requested notification of, as indicated by the event notification mask. In addition, the event is formatted as indicated by the data format information for the session. Examples of data formats that can be specified include xml, html, clear, verbose, etc.

After an event notification package for a session has been created by the event notification manager 224, the event notification manager 224 requests that the session manager 220 send the event package to the external interface (step 748). In particular, the session manager 220 knows how to contact each external interface, its port and its protocol. At step 752, the session manager 220 delivers the event package to the external user interface 308 for the session over the appropriate network 112 or 120. A determination is then made as to whether the event package was delivered successfully (step 756). If the event package was successfully delivered, the index value of the last event received for the session is updated in the session table 232, and the successful delivery is reported to the event notification manager 224 (step 760). If the event notification package is not successfully delivered, the failure of the delivery is indicated to the event notification manager 224, and the last event received index value for the session is not incremented. Accordingly, delivery of the event or events can be made as part of a subsequent event notification package.

After a successful delivery of an event notification package for a session, or after a failed attempt to deliver an event notification package, a determination may be made as to whether there are additional active sessions available (step 764). If there are additional active sessions, the next active session is selected (step 740), and the notification process returns to step 728. Also, if it was determined that notification of events was not required at step 736, after updating the last event received index value for the selected session at step 738, the next active session is selected at step 740, and the notification process returns to step 738.

If it is determined that another active session is not available (i.e. all active sessions have either been provided with a notification package, an attempt to notify has been made, or it has been determined that for any remaining sessions the particular event or events that have not yet been notified (or any event) are not to be notified as part of the session, the session manager 220 notifies the event notification manager 224 that all sessions have been processed (step 768). The event notification manager then increments the local event index 244 (step 772), and the event notification process returns to step 712 to wait for the predetermined period of time before polling the global event index for new events.

As can be appreciated by one of skill in the art from the description provided herein, methods and systems for the establishment and maintenance of authorized user information in connection with different networks 112 and 120 and different access levels for different protocols and or user interfaces through a central database or table are disclosed. In addition, session information for users, including multiple simultaneous sessions for users, can be maintained for different external user interfaces using different protocols and networks 112 and 120 on a storage system controller 124. Accordingly, embodiments of the present invention facilitate the administration of storage system controllers 124 associated with storage systems 104 that can receive commands from users interconnected to the storage system 104 through different networks 112 and 120. In addition, through the maintenance of sessions, users associated with user interfaces that do not comprise a continuous connection are no longer required to seek reauthorization in connection with each command or request made to a storage system controller 124.

In addition, methods and systems that provide for managed event notification to subscribing users are disclosed. More particularly, event notification for a plurality of users and/or external user interfaces is managed from the storage system controller 124 of a storage system 104. As a result of the controller 124 determining what events to notify users and/or external user interfaces of, the bandwidth of networks 112 and 120 interconnecting the storage system 104 to external user interfaces 308 is not generally consumed by the delivery of event notifications to external user interfaces 308 that have already received such notifications. In addition, bandwidth of the networks 112 and 120 is conserved by providing a storage system controller 124 that can determine whether notification of particular event types needs to be provided to an external interface, as compared to systems in which all events are delivered to an external interface, and the external interface is then required to sort the results to keep the notifications that are of interest to it and discard the rest.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for notifying users of events, comprising:
   detecting at a storage system controller a first event and a second event related to a data storage system;
   placing, by a management controller, said first and second events in a global event log maintained in memory associated with said storage system controller included in said data storage system;
   in response to said placing said first and second events, incrementing a global event log index value;
   polling, by an event notification manager, the global event log index;
   comparing, by said event notification manager, said global event log index value with a local event log index value;
   in response to determining that said global event log index value does not equal said local event log index value, receiving, by said event notification manager, an array of pointers to current active user sessions and session identifiers;
   in response to said receiving the array of pointers, identifying, by said event notification manager, a first active session in a session table maintained on said storage system controller;
   obtaining, by said event notification manager, at least a first notification parameter for said first active session;
   determining, by said event notification manager, that a first external interface associated with said first active session requires notification of said first event and not said second event;
   determining that said first event has not been reported in connection with said first active session;
   in response to determining that said first event has not been reported in connection with said first active session, formatting a first notification package containing a notification of said first event, wherein said first notification package is formatted in accordance with said at least a first notification parameter for said first active session;
   sending, by said storage system controller, said first notification package to a first external user interface associated with said first active session, wherein said first notification package does not include a notification of said second event;
   in response to determining that said first notification package was delivered successfully, identifying a second active session;
   obtaining at least a second notification parameter for said second active session;
   determining, by said event notification manager, that a second external interface associated with said second active session requires notification of said first and second events, wherein said first external interface implements a different communication protocol than said second external interface;
   determining that said first event and said second event have not been reported in connection with said second active session;
   in response to determining that said first event and said second event have not been reported in connection with said second active session, generating a second notification package containing notification of said first and second events, wherein said second notification package is formatted in accordance with said at least said second notification parameter for said second active session;
   sending by said storage system controller said second notification package to a second external user interface associated with said second active session.

2. The method of claim 1, further comprising:
   in response to said sending by said storage system controller said first notification package, determining whether said first notification package was delivered successfully to said first external user interface associated with said first active session;
   in response to determining that said first notification package was delivered successfully, incrementing a last event identifier for said first active session.

3. The method of claim 1, wherein said determining that said first event has not been reported in connection with said first active session includes determining that a second event prior to said first event has been reported in connection with said first active session, and wherein said first notification package includes notification of only said first event.

4. The method of claim 1, wherein in response to a successful delivery of said first notification package to said first external user interface a last event identifier for said first active session is updated, and wherein in response to a successful delivery of said second notification package to said second external user interface a last event identifier for said second active session is updated.

5. The method of claim 1, wherein in response to a successful delivery of said first notification package to said first external user interface a last event identifier for said first active session is updated, and wherein in response to an unsuccessful delivery of said second notification package to said second external user interface a last event identifier for said second active session is not updated.

6. The method of claim 1, further comprising:
   determining, by the event notification manager, that another active session is not available;
   in response to said determining that another active session is not available, incrementing the local event log index.

7. A data storage system, comprising:
   a storage system controller, including:
      a processor;
      a memory, comprising:
         global event log, wherein said event log contains information related to a first event and a second event concerning said data storage system;
         a global event log index;

a session table, wherein for each active session said session table includes an identifier of a last event for which notification was provided to a user interface associated with said active session;

a management controller, wherein said management controller detects said first and second events at the storage system controller and places information related to said first and second events in said global event log and, in response to said placing, increments said global event log index;

an event notification manager, wherein said event notification manager polls said global event log index and compares said polled global event log index to a local event log index;

in response to determining that said global event log index does not equal said local event log index, the event notification manager:

receives an array of pointers to current active user sessions and session identifiers in said session table,     identifies a first active session in said session table,     obtains at least a first notification parameter for said first active session,     determines that a first user interface associated with said first active session requires notification of said first event and not said second event;

determines that said first event has not been reported in connection with said first active session;

formats a first notification package containing a notification of said first event, in response to determining that said first event has not been reported in connection with said first active session, wherein said first notification package is formatted in accordance with said at least a first notification parameter for said first active session;

in response to the event notification manager formatting the first notification package, the storage system controller sends said first notification package to said first use interface, wherein said first notification package does not include a notification of said second event;

in response to the storage system controller determining that said first notification package was delivered successfully to said first user interface, the event notification manager;

identifies a second active session;

obtains at least a second notification parameter for said second active session;

determines that a second user interface associated with said second active session requires notification of said first and second events, wherein said first user interface implements a different communication protocol than said second user interface;

determines that said first event and said second event have not been reported in connection with said second active session;

formats a second notification package containing a notification of said first and second events, in response to determining that said first and second events have not been reported in connection with said second active session, wherein said second notification package is formatted in accordance with said at least a second notification parameter for said second active session;

in response to the event notification manager formatting the second notification package, the storage system controller sends said second notification package to said second use interface;

a first network interconnecting said storage system controller and said first user interface, wherein said first notification package of said first event is sent from said storage system controller to said first user interface over said first network; and a second network interconnecting said storage system controller and said second user interface, wherein said second notification package of said first and second event is sent from said storage system controller to said second user interface over said second network, wherein said first network implements a different communication protocol than said second network.

8. The system of claim 7, further comprising:

a storage device, wherein at least one of said first and second events concerns said storage device.

9. The system of claim 7, wherein said storage system controller further includes:

a storage controller, wherein said storage controller is an initiator on said first network;

wherein said management controller is an initiator on said second network.

* * * * *